June 10, 1952

T. HINDMARCH 2,599,632

POWER TRANSMISSION MECHANISM

Filed June 12, 1945

Inventor
T. Hindmarch
By Glaser & Downing & Seebele
Attys

June 10, 1952  T. HINDMARCH  2,599,632
POWER TRANSMISSION MECHANISM
Filed June 12, 1945  4 Sheets-Sheet 2
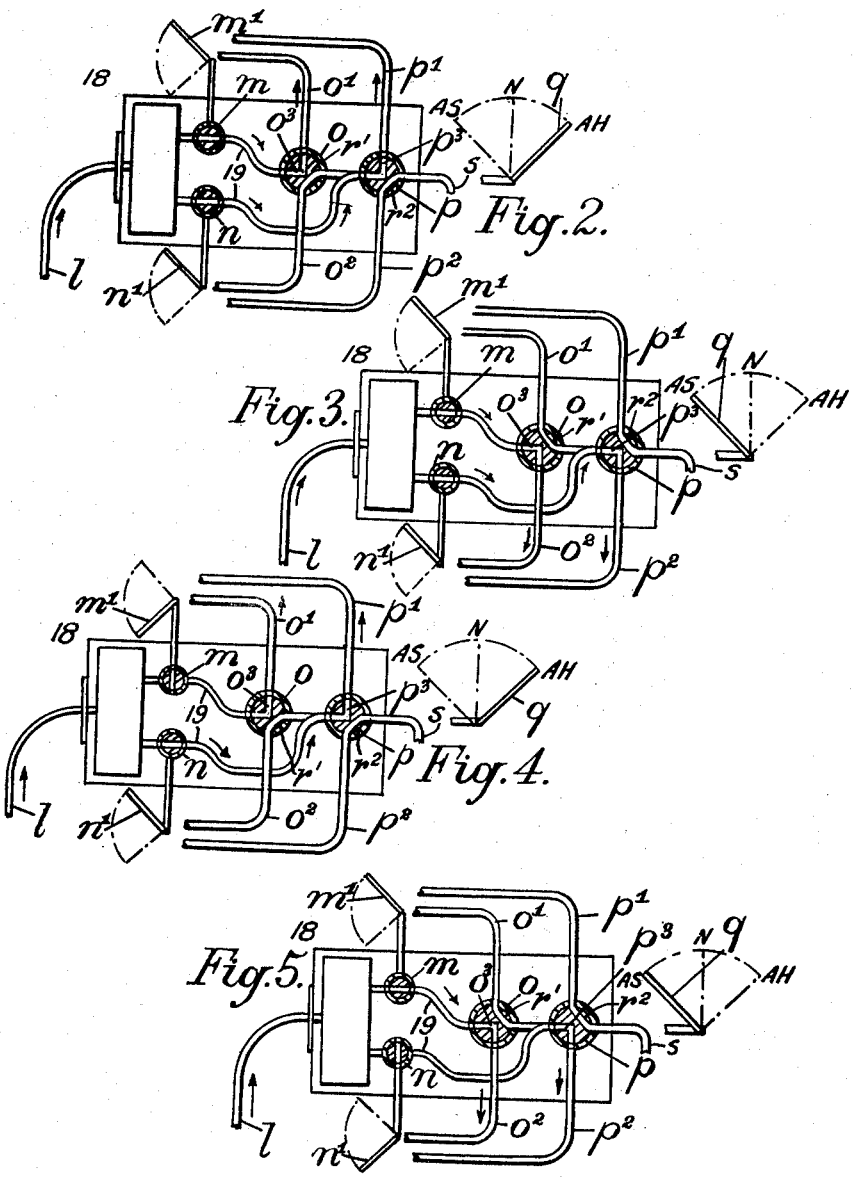
Inventor
T. Hindmarch

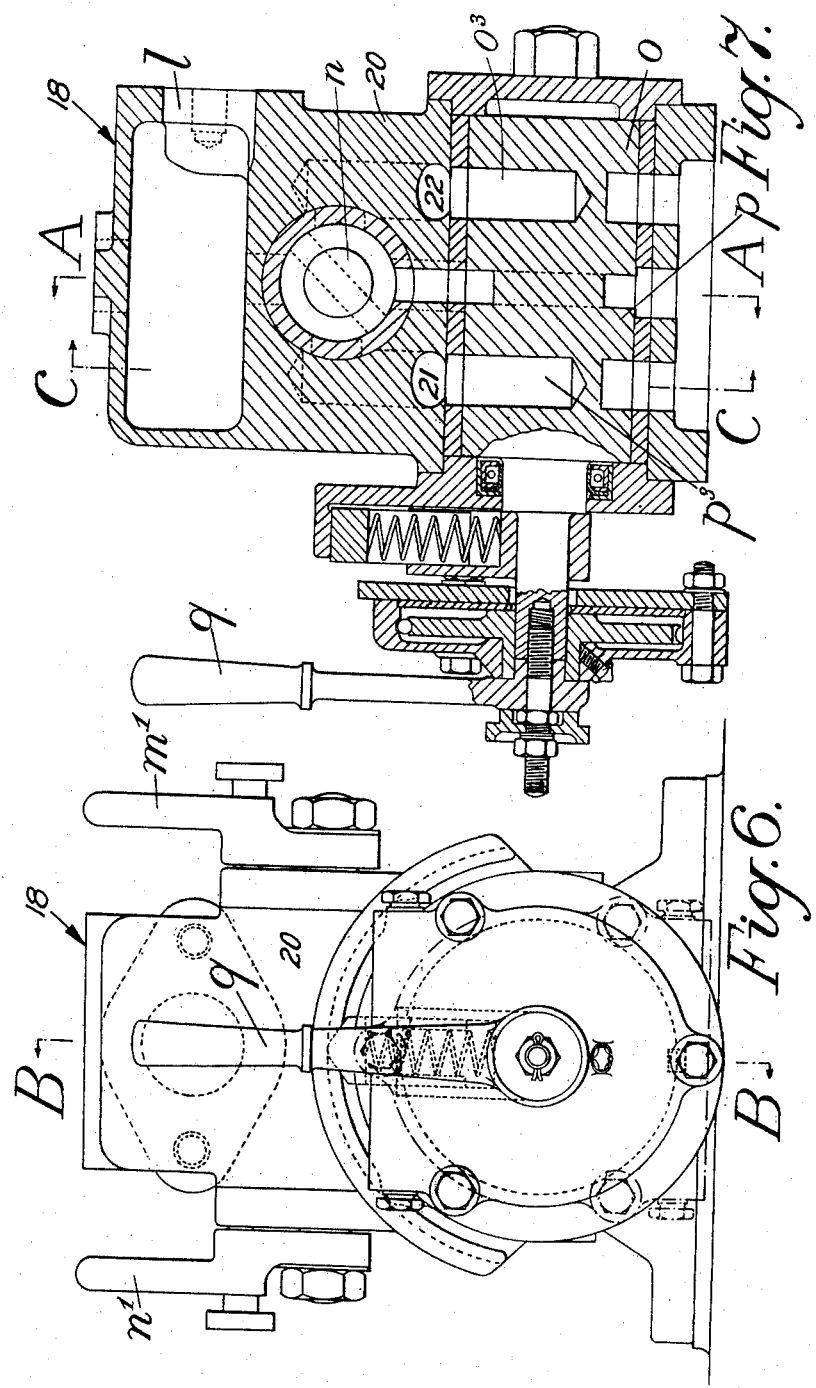

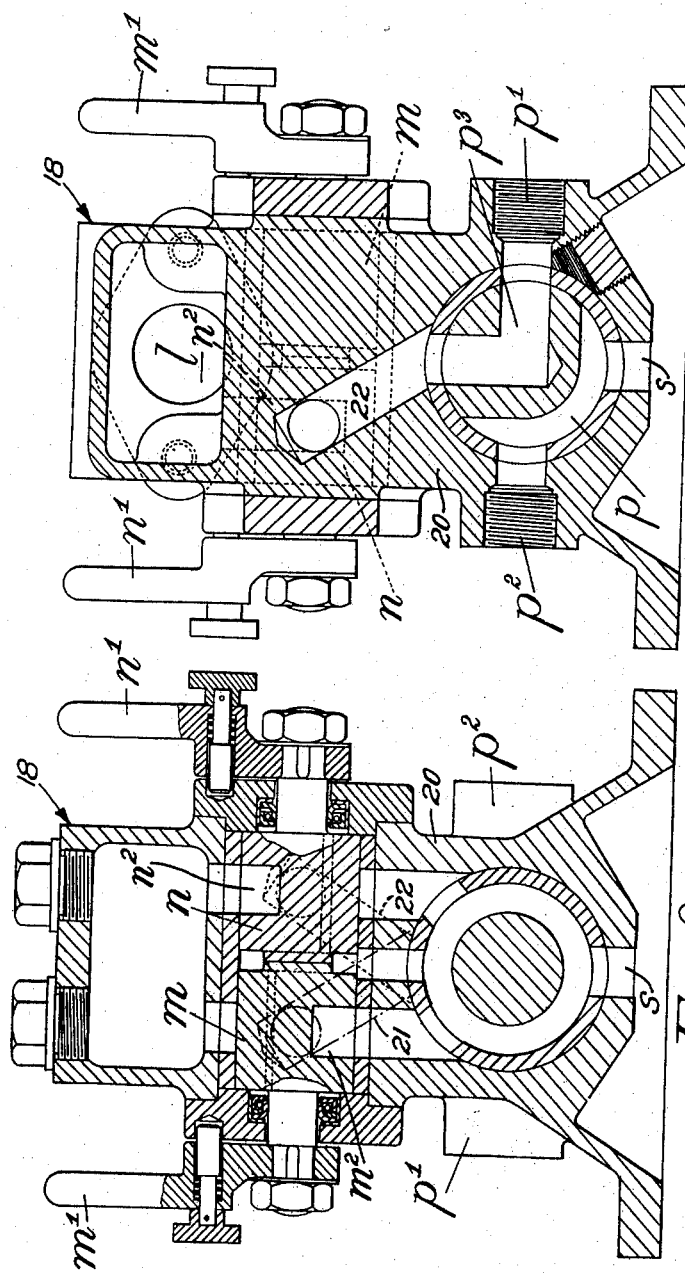

Patented June 10, 1952

2,599,632

UNITED STATES PATENT OFFICE 2,599,632

POWER TRANSMISSION MECHANISM

Thomas Hindmarch, London, England

Application June 12, 1945, Serial No. 598,992
In Great Britain April 26, 1944

1 Claim. (Cl. 192—87)

This invention relates to power transmission mechanism comprising a main output shaft associated with a plurality of prime movers each of which may be made to drive the main shaft either ahead or astern through the operation of its associated gear unit comprising oil-operated clutches or couplings for the selection of the appropriate gear unit and direction of drive, an example of such a mechanism being described in the specification of my co-pending application No. 581,885, filed March 9, 1945, now Patent No. 2,518,781.

The invention also relates to power transmission mechanism substantially as described above, but wherein one main input shaft is associated with two or more output or driven shafts all or any one of which may be driven by the main input shaft in either ahead or astern, through the operation of its associated gear unit comprising oil operated clutches or couplings for the selection of the appropriate output shaft or shafts and the direction of drive.

One object of the present invention is to provide simple and effective means for controlling the gear units so that all units selected for operation at one time must all drive in the right direction.

A further object of the invention is to provide means enabling any one or more of the units to be isolated from the gear train without affecting the proper working of the other unit or units geared to the output shaft or shafts.

According to my invention the pressure oil for operating the clutches or couplings passes from the pump (or pumps) through a master control valve with suitable connections and having one or more ahead, astern and neutral positions and such that any pressure oil passing through the valve will be led to clutches operating to drive the output shaft or shafts all in the same sense and at the same speed.

A further feature of the invention consists in providing an isolating valve for each gear unit or each output shaft interposed in the pressure oil supply pipe or pipes between the master control valve and each gear unit whereby any one or more of the units or output shafts may be isolated or cut out from the gear train without affecting the operation of any of the remaining units or output shafts.

Further features of the invention will be apparent from the description given hereafter.

In the accompanying drawings:

Figures 2 to 5 show four different arrangements of the control circuit.

Figure 6 is an elevation of one form of control apparatus in accordance with the invention.

Figure 7 is a section on the line B—B of Figure 6.

Figure 8 is a section on the line A—A of Figure 7, and

Figure 9 is a section on the line C—C of Figure 7.

Figure 1:
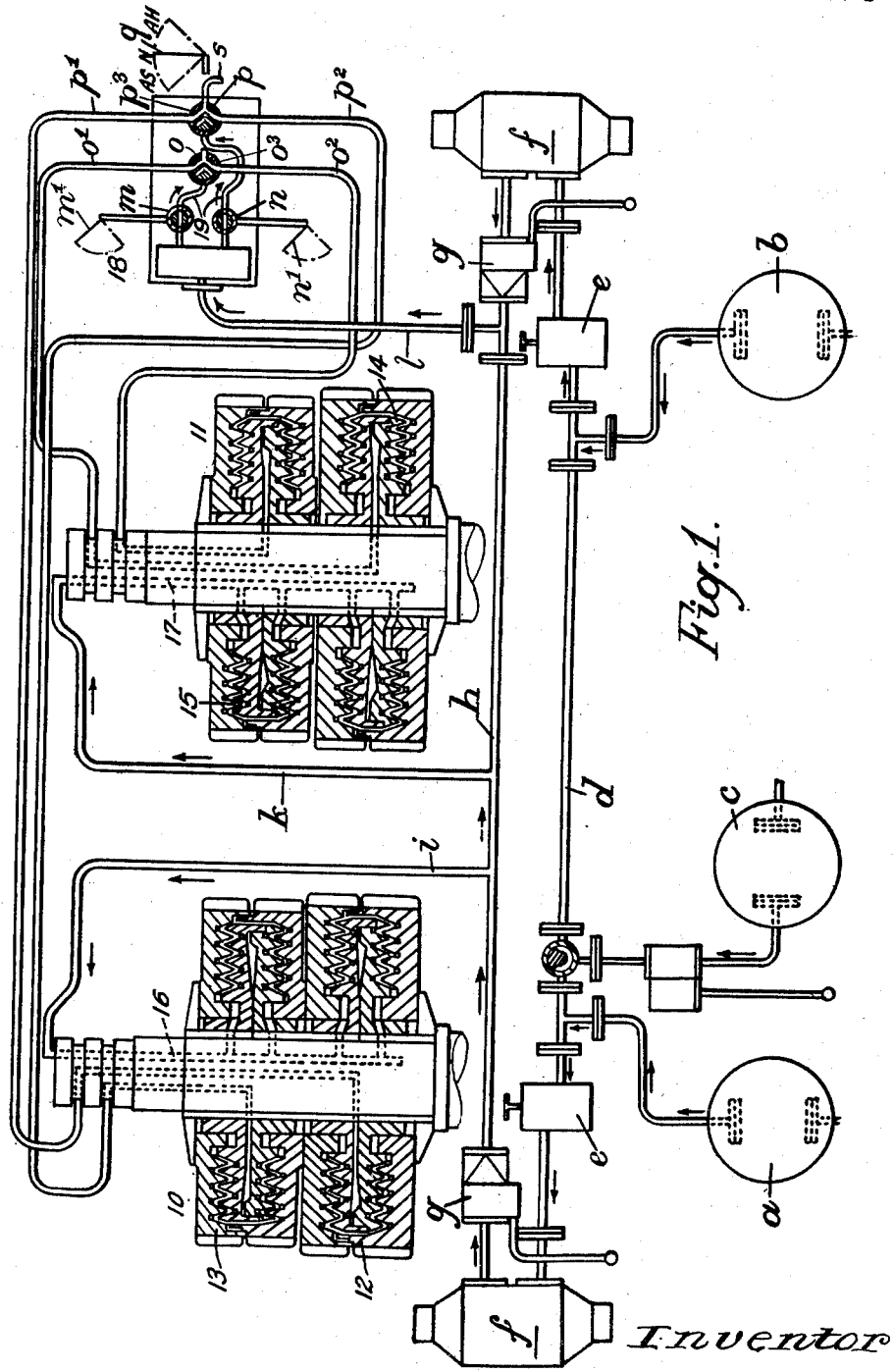
Figure 1 is a diagram of a control circuit in accordance with the invention.

In carrying my invention into effect in one convenient manner as, for example, in its application to a transmission mechanism embodying two gear units $10$ and $11$ (Figure 1) associated with a common output shaft (not shown) I provide each gear unit with oil-operated clutches or couplings for connecting the gear unit to the output shaft and selecting the proper direction of drive. The gear unit $10$ is provided with an ahead clutch $12$ and an astern clutch $13$ and the gear unit $11$ is provided in like manner with an ahead clutch $14$ and an astern clutch $15$. I further provide for each of the gear units a pressure oil pump $a$ $b$ while the main gear unit may also be provided with a trailing oil pump $c$. All the said pumps deliver the pressure oil into a common pipe $d$ and after this oil has passed through a filter $e$, cooler $f$, and pressure regulating valve $g$ it is led into a common pipe $h$ from which I take connections $i$ $k$ respectively to the neutral channels $16$ and $17$ of the clutches of the gear units $10$ and $11$ so that as soon as any pump or pumps is set into operation all the clutches of the gear units are put into neutral.

From the pipe $h$ I also take a connection $l$ to the control unit $18$ which forms the subject of this invention, and which is diagrammatically shown in Figures 1 to 5 in association with the several connections to more clearly reveal the different paths transversed by the pressure fluid. The control unit embodies two independently operable isolating valves $m$ $n$ each of which communicates with the connection $l$ and controlled by a lever $m'$ $n'$ or other operative member so that it may be placed into either of its engaged or isolated position. From each isolating valve casing I take a further connection $19$ to the master control valve which in the particular case under consideration embodies two valves $o$ $p$ which are simultaneously controlled by a single lever $q$ or other operative member having respectively ahead, neutral, and astern positions indicated at AH, N and AS. The isolating valves may be either on the inlet or on the discharge side of the master control valves.

The valve casing of the master control valves is connected by a conduit $o'$ and a channel 21 to the ahead clutch 14 by a conduit $o^2$ and a channel 23 to the astern clutch 15, by a conduit $p'$ and a channel 20 to the ahead clutch 12, and by a conduit $p^2$ and a channel 22 to the astern clutch 13. The oil under pressure admitted to the clutches through the channels 16 and 17 for the disengaging operation is applied only to the annular areas between the inner diameter of the working faces and the hubs of the clutch plates. Any oil which may pass outwardly from these annular spaces is drained off and it is then impossible for oil pressure to be built up over the working faces of the clutch plates. The oil under pressure admitted to the clutches through the conduits $o'$ and channel 21, conduit $o^2$ and channel 23, conduit $p'$ and channel 20 and by conduit $p^2$ and channel 22 is applied over the inner area of the clutch plates. Since the latter, in the standard unit, is eight (8) or ten (10) times the area between the inner diameter of the working faces and the hub, there is a differential action through which the engaging force greatly exceeds the disengaging force. The valves themselves are formed with angular ports or passages $o^3$ $p^3$ or are otherwise so arranged that when in neutral (as shown in Figure 1) the pressure oil is completely cut off at the connections 19 to the master control valve, whereas any pressure oil between the latter and any of the oil operated clutches or couplings is automatically released. The rotary members of the valves $o$ and $p$ have relief passages $r'$ and $r^2$, respectively, therein. In the positions of the valves $o$ and $p$ as shown in Figure 1, the relief passages $r'$ and $r^2$ provide communication between the connections $o'$ and $o^2$ and $p'$ and $p^2$, respectively, with an exhaust conduit $s$; in the positions of the valves $o$ and $p$ as shown in Figure 2 the relief passages $r'$ and $r^2$ provide communication between the connections $o^2$ and $p^2$, respectively, and the exhaust conduit $s$; in the positions of the valves $o$ and $p$ as shown in Figure 3, the relief passages $r'$ and $r^2$ provide communication between the connections $o'$ and $p'$, respectively, and the exhaust conduit $s$; in the positions of the valves $o$ and $p$ as shown in Figure 4, the relief passages $r'$ and $r^2$ provide communication between the connections $o^2$ and $p^2$, respectively, and the exhaust conduit $s$; and in the positions of the valves $o$ and $p$ as shown in Figure 5 the passages $r'$ and $r^2$ provide communication between the connections $o'$ and $p'$, respectively, and the exhaust conduit $s$. In the ahead position of the master control valve shown in Figure 2, the connections from the isolating valves $m$ and $n$ will be connected to the ahead clutches 12 and 14 of both units through the connections $o'$ and $p'$ and in the astern position shown in Figure 3 the said connections from the isolating valves will be connected to both astern clutches 13 and 15 through the connections $o^2$ and $p^2$.

The isolating valves and the master control valve may be arranged in separate casings or valve chests having appropriate pipe connections therebetween or preferably as shown in Figures 6 to 9, both sets of valves will be arranged in a single casing 20 having appropriate sports or passages therein for effecting the necessary connections between the parts of the casing enclosing the respective valves. As shown in Figures 6 to 9 the two valves $m$ and $n$ are mounted in a chamber in the casing 20, the related levers $m'$ and $n'$ being arranged externally (Figure 8). When the valves $m$ and $n$ are opened the ports $m^2$ and $n^2$ establish communication between the connection $l$ and the passages 21 and 22 in the casing 20 leading to the chamber in which the valves $o$—$p$ are mounted. In this embodiment of the invention the valves $o$—$p$ are integrally joined to form a unit operable by the lever $q$. The ports $o^3$ and $p^3$ are so arranged that in the angular position indicated at AH (Figure 2) said ports establish communication between the passages 21 and 22 and the connections $o'$ and $p'$ leading to the ahead clutches while in the position AS communication is established between the passages 21 and 22 and the connections $o^2$ and $p^2$ to the astern clutches (Figure 3).

The arrangement is such that with the pumps $a$ and $b$ working and the isolating valves $m$ and $n$ both being open but the master control valve $o$—$p$ in neutral (Figure 1) the engines of both gear units will be running but the output shaft of the gear box will be stationary. When the master control valve is moved into the ahead position (Figure 2) the ahead clutches 12 and 14 of both units will be operated and both units will therefore drive the output shaft in the ahead direction. In such a position either of the isolating valves may be moved into the closed or isolated position which will cut off the flow of pressure fluid to the corresponding control valve, but since the isolating valves have no release ports, pressure will be maintained until a subsequent operation of the interconnected control valves, whereupon the gear unit corresponding to said closed isolating valve will be cut out of the gear train but the other unit will continue to drive the output shaft ahead. In Figure 4 I have shown the upper isolating valve $m$ moved into the isolating position.

With both isolating valves $m$ and $n$ open and the master control valve in the astern position (Figure 3) the astern clutches 13 and 15 of both gear units will be operated so that both units will drive the output shaft in the astern direction and here again either of the isolating valves may be closed so as to cut out one of the units upon the next operation of the interconnected control valves while leaving the other unaffected and thus continuing to drive the output shaft astern. The lower isolating valve $n$ is shown in Figure 5 in the isolated position.

It will be clear that while I have specifically described the invention in relation to a 2-unit gear box with one speed in ahead and astern directions it may with suitable multiplication of valves be applied with equal effect and like advantage to a multi-engine-driven gear box with 2, 3, 4, or more input shafts and 2, 3 or more speeds in both directions of rotation. It may also be applied to a gear-box having one input shaft associated with 2, 3 or more output shafts with more than one speed in both directions or drive. Moreover, I may vary the arrangement of valves and the means for operating the same depending upon the nature of the multi-unit installation to which the invention is to be applied or any practical requirements that may have to be fulfilled.

Furthermore, it will also be clear that I have specifically described and shown on the various drawings the master and isolating control valves designed for the passage and distribution of oil or other fluid under any, but constant, pressure as may be required to operate the clutches, but it will be understood that I can also incorporate or combine with any one or both the isolating and/or master control valves a pressure reducing valve or any other device which, when any of the operating levers connected to any of the valves are in a certain position, will effect a reduction in pressure in the oil circuit leading from the control valves to the oil operated clutches thus causing a more gradual "take-up" on the clutches than would be the case were the full operating oil pressure applied to the oil operated clutches as hitherto described.

I claim:

In combination with a pair of driving shafts adapted to drive a driven shaft, a pair of ahead and astern clutches each comprising clutch housings freely mounted on the respective driving shafts and adapted for mechanical driving engagement with the driven shaft, a pair of clutch plates mounted in back-to-back relationship in each clutch housing and splined to the corresponding drive shaft, each of said clutch plates forming with the adjacent inner face of its clutch housing an expansible fluid chamber of small effective area, and each pair of said clutch plates forming between them an expansible fluid chamber of relatively large effective area, a source of pressure fluid, a conduit for constantly supplying fluid under pressure from said source to the small area fluid chambers of all of said clutches to urge said pairs of clutch plates toward one another and away from their corresponding inner housing faces and thereby to disconnect the driving shafts entirely from the driven shaft, a pair of control valves mechanically interconnected for simultaneous movement and each having a pressure fluid inlet and being movable to supply pressure fluid to the large effective area chambers of said ahead and astern clutches respectively, while releasing the pressure fluid from the large effective area chambers of the others of said clutches, a pressure fluid supply conduit extending to the inlet of each of said control valves, and an independently operable individual non-pressure-releasing isolating valve in each of said supply conduits between said source of pressure fluid and said respective control valves, whereby operation of said isolating valves enables pre-selection of the particular ahead and astern clutches which will be caused to engage by a change in the position of said interconnected control valves, by virtue of the maintenance of fluid pressure by said isolating valves until the same is released upon movement of said control valves.

THOMAS HINDMARCH.

REFERENCES CITED

The following references are of record in the file of this patent:

UNITED STATES PATENTS

| Number | Name | Date |
|---|---|---|
| 1,472,930 | Mayer | Nov. 6, 1923 |
| 1,953,486 | Kiep | Apr. 3, 1934 |
| 2,283,133 | Allen et al. | May 12, 1942 |
| 2,366,020 | Good | Dec. 26, 1944 |
| 2,396,231 | Brill | Mar. 12, 1946 |

FOREIGN PATENTS

| Number | Country | Date |
|---|---|---|
| 516,582 | Great Britain | Jan. 5, 1940 |